United States Patent
Rajaie

(10) Patent No.: US 11,682,422 B1
(45) Date of Patent: Jun. 20, 2023

(54) PERMANENT MAGNET DEGAUSSER MECHANISM FOR DESTROYING THE FUNCTIONALITY OF DATA BEARING COMPONENTS OF MAGNETIC MEDIA DATA BEARING DEVICES

(71) Applicant: Sepehr Rajaie, Pataskala, OH (US)

(72) Inventor: Sepehr Rajaie, Pataskala, OH (US)

( * ) Notice: Subject to any disclaimer, the term of this patent is extended or adjusted under 35 U.S.C. 154(b) by 0 days.

(21) Appl. No.: 17/733,927

(22) Filed: Apr. 29, 2022

(51) Int. Cl.
  G11B 5/00     (2006.01)
  G11B 5/02     (2006.01)
  G11B 5/465    (2006.01)
  G11B 5/09     (2006.01)
  G11B 5/012    (2006.01)

(52) U.S. Cl.
  CPC ............. G11B 5/465 (2013.01); G11B 5/012 (2013.01); G11B 5/09 (2013.01)

(58) Field of Classification Search
  CPC .. G11B 2005/0018; G11B 2020/10851; G11B 2020/012; G11B 5/012; G11B 5/00; G11B 5/024; G11B 5/0245; G11B 5/03; G11B 5/10; G11B 5/265; G11B 5/325; G11B 5/02; G11B 23/282; G11B 5/016; G11B 5/127; G11B 5/825

USPC ................... 360/66, 121, 124, 118; 361/149
See application file for complete search history.

(56) References Cited

U.S. PATENT DOCUMENTS 10,438,614 B1* 10/2019 Wang ................ H01F 6/06
2008/0013245 A1* 1/2008 Schultz .............. G11B 5/0245

* cited by examiner

Primary Examiner — Nabil Z Hindi
(74) Attorney, Agent, or Firm — Jeffrey M. Furr; Furr Law Firm

(57) ABSTRACT

A Permanent Magnet Degausser Mechanism for Destroying the Functionality of Data Bearing Components of Magnetic Media Data Bearing Devices. This permanent magnet degausser mechanism provides reconciliation and tracking with a unique. identification tag using a secure and proprietary database, destruction of the functionality of the data bearing components of magnetic media data bearing devices using an automated movement system, a NSA Certified high strength degausser, digital pre-degaussing and post-degaussing readings to indicate the completion of the process of destroying the functionality of the data bearing components including storage of readings and containment of the remains of the magnetic media devices for verification.

20 Claims, 1 Drawing Sheet

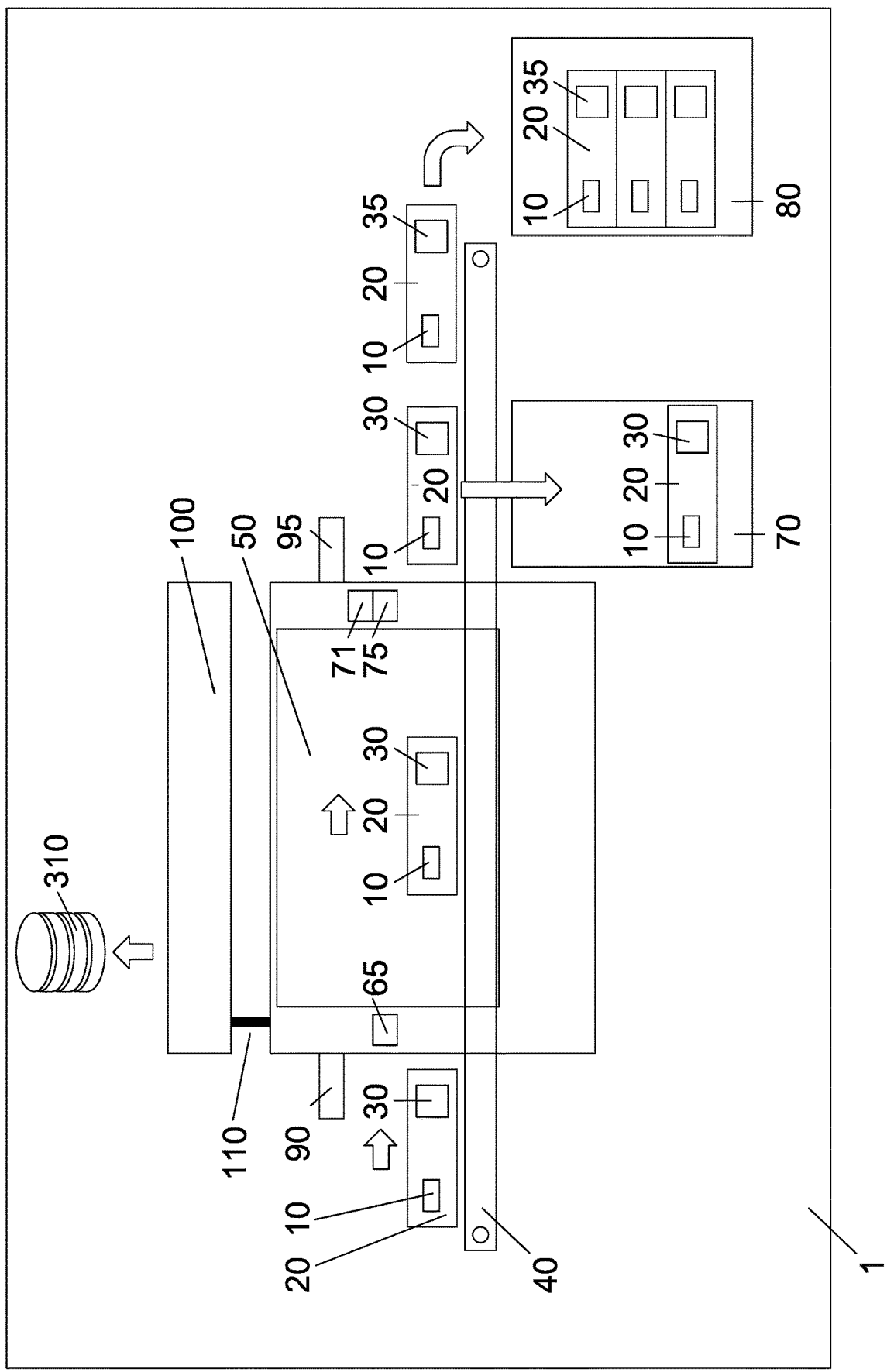

PERMANENT MAGNET DEGAUSSER MECHANISM FOR DESTROYING THE FUNCTIONALITY OF DATA BEARING COMPONENTS OF MAGNETIC MEDIA DATA BEARING DEVICES

CROSS-REFERENCES TO RELATED APPLICATIONS (IF ANY)

Not Applicable

BACKGROUND

1. Field of the Invention

The present invention relates to a device and system for a Permanent Magnet Degausser Mechanism for Destroying the Functionality of Data Bearing Components of Magnetic Media Data Bearing Devices.

2. Description of Prior Art

Magnetic media data bearing devices that eventually fail or are decommissioned are separated from the host server or array or other computer device and need to have the functionality of the data bearing components destroyed so that the data is no longer usable. This process must be verified to meet cyber security regulations.

Other systems may not track devices during the data destruction process. Other systems may not have methods for reading completion of their process or digital storage of readings to show that the functionality of data bearing components has been destroyed. Other systems may not be intended for use with magnetic media data bearing devices that have had changes in their characteristics. Other systems may not be changeable to meet changes made to cyber security regulations. Other systems may not process magnetic media data bearing devices in a time saving manner. Other systems may not be used within an organization's secure location.

There is still room for improvement in the art.

SUMMARY OF THE INVENTION

The present invention is a Permanent Magnet Degausser Mechanism for Destroying the Functionality of Data Bearing Components of Magnetic Media Data Bearing Devices.

This permanent magnet degausser mechanism provides reconciliation and tracking with pre-degausser and post-degausser scanning of a unique identification tag using a secure and proprietary database, destruction of the functionality of the data bearing components of magnetic media data bearing devices using an automated movement system, a NSA certified high strength degausser, digital pre-degaussing and post-degaussing readings from pre-degausser and post-degausser readers to indicate the completion of the process of destroying the functionality of the data bearing components including storage of readings for verification and containment of the remains of the magnetic media devices for verification.

This mechanism is portable, is intended for use within the customer's secure confines (datacenter or enterprise facility), and is anticipated to process 10,000 units/8 hours. It has modular components adaptable for changes in the characteristics of magnetic media data bearing devices and changes in cybersecurity regulations for data destruction.

It is more efficient, effective, accurate and functional than the current art.

BRIEF DESCRIPTION OF THE DRAWINGS

Without restricting the full scope of this invention, the preferred form of this invention is illustrated in the following drawings:

FIG. 1 shows a diagram of some of the components of the invention.

DESCRIPTION OF THE PREFERRED EMBODIMENT

There are a number of significant design features and improvements incorporated within the invention.

As shown in FIG. 1, the present invention is a device and system for a permanent magnet degausser mechanism 1 for destroying the functionality of data bearing components of magnetic media data bearing devices 20.

Magnetic media data bearing devices 20 that eventually fail or are decommissioned are separated from the host server or array or other computer device and need to have the functionality of the data bearing components destroyed so that the data is no longer usable. This process must be verified to meet cybersecurity regulations. The invention claimed here solves this problem.

When the failed or decommissioned magnetic media data bearing device 20 is removed from the host server or array or other computer device and is designated for destruction of data, it will be reconciled and tracked by being enrolled into the secure and proprietary database 310 using computer system 100 and assigned a unique identification tag 10 tagging them with a unique Radio Frequency Identification ("RFID") or bar codes or PID or active identification tag 10 which is scanned by the pre-degaussing scanner 90. Digital pre-degaussing reader 65 will take a pre-degaussing reading. The device 20 will be processed using the permanent magnet degausser mechanism 1 to destroy the functionality of the data bearing components 30 by using a magnetic field using an automated movement system 40 and an NSA Certified high strength degausser 50. Post-degaussing reader 75 will take a reading and the post-degaussing scanner 95 will scan the unique identification tag 10 and the digital readings are recorded into the secure and proprietary database 310 as part of the mechanism 1 for later verification. If the post-degaussing reading from post-degausser reader 75 indicates that the functionality of the data bearing components 30 has not been destroyed, an indicator 71 will be activated, and that magnetic media data bearing device 20 will be contained in a designated container/exit port 70 in order to repeat the permanent magnet degausser mechanism 1 processing to achieve a post-degaussing reading that indicates the functionality of the data bearing components 30 has been destroyed. Magnetic media devices 20 that have post-degaussing readings from post-degausser reader 75 that indicate the functionality of the data bearing components has been destroyed producing a magnetic media device with destroyed functionality of the data bearing components 35 will be contained in a designated container/exit port 80 for verification.

This permanent magnet degausser mechanism 1 provides reconciliation and tracking with a unique identification tag 10, pre-degaussing identification tag scanner 90 and post-degaussing identification tag scanner 95, pre-degaussing reader 65 and post-degaussing reader 75 using a secure and proprietary database 310 that uses computer system 100.

The permanent magnet degausser mechanism 1 destroys the functionality of the data bearing components 30 of magnetic media data bearing devices 20 using an automated movement system 40, a NSA Certified high strength degausser 50, digitally stored pre-degaussing and post-degaussing readings using a secure and proprietary database 310 to indicate that the functionality of the data bearing components has been destroyed producing a magnetic media device with destroyed functionality of the data bearing components 35. Then it has the containment of the remains of magnetic media devices 20 for verification. This permanent magnet degausser mechanism 1 is anticipated to be able to process 10,000 pieces in 8-hours. Also, this permanent magnet degausser mechanism 1 can be produced to allow for transportation to and use of the mechanism 1 within a user or customer's secure locations. The components of this permanent magnet degausser mechanism 1 are modular and can be changed based on changes in the characteristics of magnetic media products 20 and changes in the cyber security regulations for data destruction.

Components

1. An automated system for movement 40 of magnetic media data bearing devices 20.
2. A computer system 100 connected by a cable 110 with a secure and proprietary database 310 and pre-degaussing scanner 90 for scanning the unique identification tag 10 of each magnetic media data bearing device 20.
3. An entry port of mechanism 1 for magnetic media data bearing devices 20 which have had their unique identification tag 10 scanned by the pre-degaussing scanner 90.
4. A pre-degaussing reading by a pre-degaussing reader 65 of the magnetic media data bearing devices 20 with a digital storage of readings in the database 310.
5. A permanent NSA Certified high strength magnet 50 for degaussing magnetic media data bearing devices 20 data bearing components 30.
6. A post-degaussing reader 75 of magnetic media data bearing devices 20 with digital storage of readings in the database 310.
7. A post-degaussing scanner 95 for scanning the unique identification tag 10 of each magnetic media data bearing device 20.
8. A system 71 for indicating that the process of destroying the functionality of the data bearing components 30 on the magnetic media data bearing device 20 was not complete and that reprocessing of the magnetic media data bearing device 20 is required
9. A container/exit port 70 for magnetic media data bearing devices 20 that are required to be reprocessed.
10. A system for reprocessing magnetic media data bearing devices 20 that are required to be reprocessed.
11. A container/exit port 80 for the remains of magnetic media devices with destroyed functionality of the data bearing components 35 as indicated by post-degaussing reader 75 until verification Steps for Using the Mechanism 1 and System Step 1 is when the magnetic media data bearing device begins the process to be reconciled and tracked by being enrolled into the secure and proprietary database 310 using computer system 100 and assigned a unique identification tag 10 using a unique Radio Frequency Identification ("RFID") or bar codes or PID or active identification tag 10.

Step 2 begins the process of moving the magnetic media data bearing device 20 into the permanent magnet degausser mechanism 1 using the automated system of movement 40.

Step 3 is when the magnetic media data bearing device 20 has its unique identification tag 10 scanned into the database 310 by the scanner 90 using computer system 100 connected by cable 110.

Step 4 is when the magnetic media data bearing device 20 enters the permanent magnet degausser mechanism 1.

Step 5 is the reading and recording of the magnetic media data bearing device 20 by the pre-degaussing reader 65.

Step 6 is the destroying of the functionality of the data bearing components 30 on the magnetic media data bearing device 20 within the permanent magnet degausser mechanism 1 by permanent NSA Certified high strength magnet 50.

Step 7 is the reading and recording of the magnetic media device 30 by the post-degaussing reader 75.

Step 8 is when the system 71 is activated when the post-degaussing reading indicates that the functionality of the data bearing components 30 of the magnetic media data bearing device 20 was not complete and includes auditory and/or visual signals to the operator of the permanent magnet degausser mechanism 1.

Step 9 is the exit of the magnetic media data bearing device 20 which does not have the functionality of the data bearing components destroyed and requires reprocessing to have its unique identification tag 10 scanned into the database 310 by the post-degaussing scanner 95 through a designated container/exit port 70 leading to Step 10.

Step 10 is the system 70 for containing magnetic media data bearing devices 20 to be reprocessed starting at Step 1.

Step 11 is the exit of the magnetic media 20 that has the functionality of the data bearing components destroyed producing destroyed data bearing components 35 as indicated by the (Step 7) post degaussing reader 75 to have its unique identification tag 10 scanned into the database 310 by the post-degaussing scanner 95 through a designated container/exit port 80 leading to Step 12.

Step 12 is the system 80 for containing the remains of magnetic media 20 with functionality of data bearing components destroyed 35 until verification.

Advantages

Organizations can be confident that the functionality of the data bearing components of the magnetic media bearing devices has been destroyed based on pre-degaussing and post-degaussing readings that indicate the differences in field intensity. This alleviates the potential problem of the organization damaging their brand due to leaks of secure data onto the global network. It solves an insider threat in cybersecurity. It saves the organization time and effort in marketing and answering claims in the legal system regarding secure data breaches. It helps the organization meet cybersecurity regulations and avoid significant fines for non-compliance.

Additionally: Any organization that wants to destroy the functionality of magnetically stored information would want to use this permanent magnet degausser mechanism as described to ascertain that the functionality of the stored information no longer exists. Therefore, the process would protect the organization from information security compromise, which would save them from spending time and resources to counteract the loss.

CONCLUSION

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A device of destroying data on magnetic media data bearing devices:
a mechanism that receives magnetic media data bearing devices that are tagged, scanning the tag using a scanning means, reading the data on the data bearing components using pre-degaussing readers, destroy the functionality of the data bearing components using a permanent magnet degausser, reading the data on the data bearing components using post-degaussing readers that indicate the differences in field intensity, registering the readings to confirm it has been deleted, using a signaling system when the readings indicate that the data has not been deleted, scanning the tag on exit from the mechanism, using a designated container/exit for devices with readings to confirm deletion until verification, and using a designated container/exit for devices with readings that do not confirm deletion and require reprocessing with the mechanism.

2. The device according to claim 1 using computer system.

3. The device according to claim 1 having a Pre-degaussing reader.

4. The device according to claim 1 having a Post-degaussing reader.

5. The device according to claim 1 having a pre-degaussing scanner and a post-degaussing scanner for scanning identification tags on magnetic media data bearing devices.

6. The device according to claim 1 having a designated container/exit port for magnetic media devices with readings to confirm the data has been deleted to be contained for verification.

7. The device according to claim 1 having a signaling system which is activated when the readings confirm that the functionality of the data has not been deleted.

8. The device according to claim 1 having a designated container/exit port for magnetic media data devices with readings to confirm the data has not been deleted to be contained for reprocessing by the mechanism.

9. The device according to claim 1 having a moving track which holds and moves the magnetic media data bearing devices.

10. The device according to claim 1 where the device is portable and components are modular.

11. The device according to claim 1 using a NSA Certified high strength degausser.

12. A system of destroying data on a magnetic media data bearing devices:
tagging the magnetic media data bearing devices, having a mechanism that receives magnetic media data bearing devices that are tagged, scanning the tag using a scanning means, reading the data on the data bearing components using pre-degaussing readers, destroy the functionality of the data bearing components using a permanent magnet degausser, reading the data on the data bearing components using post-degaussing readers that indicate the differences in field intensity, registering the readings to confirm it has been deleted, using a signaling system when the readings indicate that the data has not been deleted, scanning the tag on exit from the mechanism, using a designated container/exit for devices with readings to confirm deletion until verification, and using a designated container/exit for devices with readings that do not confirm deletion and require reprocessing with the mechanism.

13. The system according to claim 12 using a computer system.

14. The system according to claim 12 having a Pre-degaussing reader.

15. The system according to claim 12 having a Post-degaussing reader.

16. The system according to claim 12 having a pre-degaussing scanner and a post-degaussing scanner for scanning identification tags on magnetic media data bearing devices.

17. The system according to claim 12 having a designated container/exit port for magnetic media data devices with readings to confirm the data has been deleted to be contained for verification.

18. The system according to claim 12 having a signaling system which is activated when the readings confirm that the functionality of the data has not been deleted.

19. The system according to claim 12 having a designated container/exit port for magnetic media data devices with readings to confirm the data has not been deleted to be contained for reprocessing by the mechanism.

20. The system according to claim 12 using a NSA Certified high strength degausser.

* * * * *